United States Patent [19]
Fuchs et al.

[11] Patent Number: 5,862,786
[45] Date of Patent: Jan. 26, 1999

[54] COLD STARTING ASSISTANCE FOR DIESEL ENGINES

[75] Inventors: Heinz-Wolfgang Fuchs, Remscheid; Reinhard Rechberg, St. Augustin; Harald Siegert, Cologne, all of Germany

[73] Assignee: Deutz AG, Cologne, Germany

[21] Appl. No.: 834,911

[22] Filed: Apr. 7, 1997

[30] Foreign Application Priority Data

Apr. 26, 1996 [DE] Germany ................. 196 16 651.9

[51] Int. Cl.[6] ................................................. F02N 17/02
[52] U.S. Cl. ........................ 123/142.5 E; 123/556; 123/179.6; 123/179.21
[58] Field of Search ............... 123/142.5 E, 179.6, 123/179.21, 549, 556

[56] References Cited

U.S. PATENT DOCUMENTS

| 4,667,645 | 5/1987 | Gluckman | 123/179.21 |
| 5,094,198 | 3/1992 | Trotta et al. | 123/179.21 |
| 5,241,929 | 9/1993 | Grassi et al. | 123/179.6 |
| 5,469,819 | 11/1995 | Berger et al. | 123/179.6 |
| 5,482,013 | 1/1996 | Andrews et al. | 123/179.21 |
| 5,634,443 | 6/1997 | Mathews | 123/179.21 |

FOREIGN PATENT DOCUMENTS

| 30 335 40 | 3/1981 | Germany . | |
| 58-51260 | 3/1983 | Japan | 123/179.21 |
| 2159578 | 12/1985 | United Kingdom | 123/179.6 |

*Primary Examiner*—Erick R. Solis
*Attorney, Agent, or Firm*—Charles L. Schwab; Hardaway Law Firm, P.A.

[57] ABSTRACT

Method and apparatus for cold starting assistance for diesel engines including use of a sheathed-element glow plug in the combustion chamber and a heater plug in the air intake, which plugs are operated by a control device (15) responsive to engine operating parameters, particularly engine temperature.

4 Claims, 2 Drawing Sheets

COLD STARTING ASSISTANCE FOR DIESEL ENGINES

TECHNICAL FIELD

This invention relates to an auto-ignition internal combustion engine having a crankcase and at least one cylinder unit, including a cylinder, a piston and a cylinder head forming a combustion chamber having an accompanying fuel and air intake system. A sheathed-element glow plug is provided for the combustion chamber.

BACKGROUND OF THE INVENTION

In German patent number DE-OS 30 33 540 a control device is provided which controls operation of sheathed-element glow plugs in accordance with specified requirements. Provision is also made to continue operating the sheathed-element glow plugs after the internal combustion engine has been started; until it is certain that the internal combustion engine has reached a minimum temperature.

OBJECTS AND SUMMARY OF THE INVENTION

It is an object of the invention to provide a diesel engine, and a method for operating such an internal combustion engine, with an improved cold starting assistance system.

It is a further object of this invention to provide a cold starting assistance system which includes automatic controls for operating heater plugs and sheathed-element glow plugs responsive to ambient temperature and/or engine temperature.

These objects are achieved by providing a cold starting assistance system which uses at least one heater plug installed in the intake system, a sheathed-element glow plug in the combustion chamber and a control device for operating the plugs. By this invention, a significant improvement in the capabilities of the cold starting assistance and, in particular, of the warmup period of the diesel engine is achieved at a minimal additional expense.

The control device has outputs for independently driving at least two heater plugs and one further output for driving a plurality of sheathed-element glow plugs. This construction represents a very good utilization of the control capabilities in that the intake air is preheated with, for example, two heater plugs, and sheathed-element glow plugs corresponding to the number of cylinders of the internal combustion engine (for example four sheathed-element glow plugs in the case of a four-cylinder internal combustion engine) are controlled separately from the heater plugs. The heater plug(s) and the sheathed-element glow plugs are operated, that is, heated, in a cold start in dependence on the ambient temperature or the temperature of the internal combustion engine. Thus, when the ambient temperature and the temperature of the internal combustion engine are unequal, it is possible to control both the preheat times of the heater plug(s) and the sheathed-element glow plug(s) and the number of heater plugs being heated as well as the intensity of heating in accordance with the requirements. After starting of the internal combustion engine, in particular during the warmup period of the internal combustion engine, it may be desirable to continue to operate the heater plugs. By this cold starting system, or the method according to the invention, the exhaust emission of the internal combustion engine can be markedly lowered, this being applicable in particular to white smoke at higher rotation speeds. The control device is designed and constructed in such fashion that all other meaningful parameters, including the coolant temperate and the intake air temperature, as well as the lubricant temperature, if appropriate, are fed into the control device and processed by it. The heater plug(s) and the sheathed-element glow plug(s) are then operated on the basis of control curves, which may also be three-dimensional if appropriate. It is also possible within the framework of the invention to consider particular requirements of the internal combustion engine, for example emission optimization, reliability optimization or consumption optimization depending on the intended purpose of the internal combustion engine.

BRIEF DESCRIPTION OF THE DRAWINGS

An exemplary embodiment of the invention is illustrated in the drawings, in which.

DETAILED DESCRIPTION OF THE INVENTION

Figure 1:
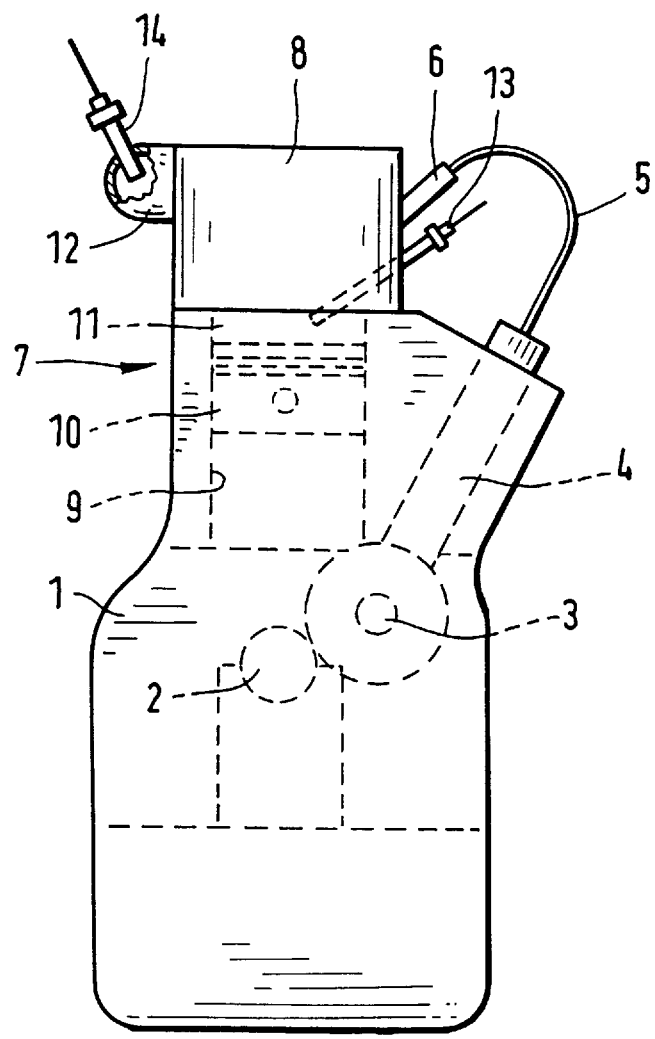
FIG. 1 shows an internal combustion engine having a heater plug and a sheathed-element glow plug and FIG. 2 shows a circuit diagram of a control device for the heater plugs and sheathed-element glow plugs.

FIG. 1 shows a diesel engine, illustrated schematically, which has a crankcase 1 in which a crankshaft 2 is rotatably supported. Via a toothed belt, or by a single meshing of gears, the crankshaft 2 drives a camshaft 3, which in turn drives the intake and exhaust valves and individual injection pumps 4 provided for the cylinders. Each individual injection pump 4 is connected to an injection valve 6 via a short injection line 5, which injection valve is arranged in the cylinder head 8 assigned to the one cylinder unit 7. Each cylinder unit 7 has a cylinder or cylinder tube 9 in which a piston 10 reciprocates, the piston 10 being connected to the crankshaft 2 via a connecting rod. The piston 10 together with the cylinder tube 9 and the cylinder head 8 forms a combustion chamber 11, to which combustion air is supplied via the intake and exhaust valves, which are connected to an air intake structure 12. Fuel is supplied to the combustion chamber 11 by means of the injection valve 6, the fuel-air mixture formed in the combustion chamber 11 being ignited by means of the compression effected by the reciprocating piston 10, which moves up and down.

Figure 2:
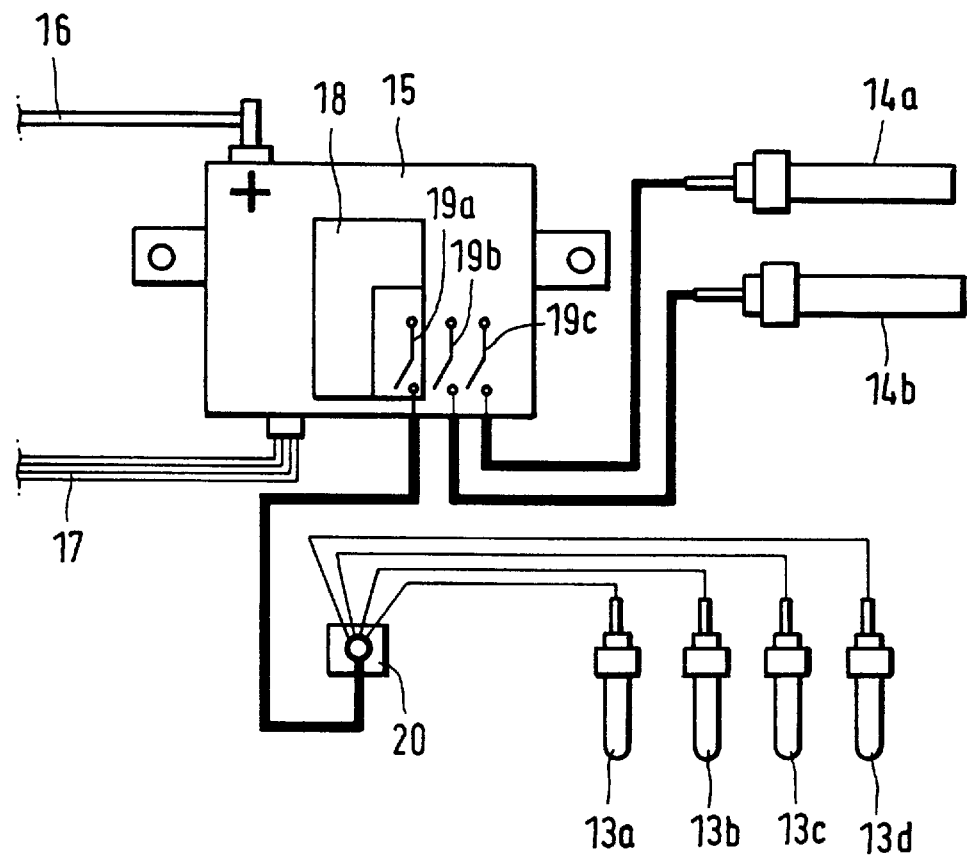

In a cold start of the internal combustion engine, the ignition is assisted by a glow plug 13 provided in the combustion chamber 11 of each cylinder unit 7 and a heater plug 14 arranged in the intake system 12. The heater plug 14 and the glow plug 13 are controlled by a control device 15 (FIG. 2). The control device 15, which may be designed to control other parameters of the internal combustion engine, has a an electrical input 16 and various measured-value lines 17 via which at least various motor temperature parameters can be supplied to the control device 15. Present in the control device are electronic circuits 18, which drive various voltage outputs 19a, 19b, and 19c. In the exemplary embodiment of FIG. 2, the voltage or power output 19a is connected via a distributor means 20 to four glow plugs 13a, 13b, 13c, 13d, while the voltage outputs 19b and 19c are connected to, respectively, heater plugs 14a and 14b. The control device 15, with its circuits 18, is designed such that it can operate the power outputs 19a, 19b, 19c individually or jointly in dependence on at least the motor temperature parameter, the voltage and/or the current in each case being controlled automatically.

What is claimed is:

1. A diesel engine having a crankcase and at least one cylinder unit, including a cylinder, a piston and cylinder head forming a combustion chamber with an air intake structure, the combination comprising:

at least one heater plug (14) in said air intake structure (12), a sheathed-element glow plug (13) in said combustion chamber, an automatic control device (15) having an input line (17) for receiving engine temperature parameter signals and having a separate power output (19a, 19b, 19c) connected to each of said heater and glow (14, 13), said automatic control device (15) supplying electric power to one of said heater and glow plugs (14, 13) during start-up of said engine upon being supplied a first engine temperature Parameter signal indicating a temperature below a first predetermined value and said automatic control device (15) supplying electric power to said heater plug (14) and said glow plug (13) during start up of said engine upon being supplied a second engine temperature parameter signal indicating a temperature below a second predetermined value.

2. The diesel engine of claim 1 wherein said engine includes two heater plugs (14) in said air intake structure and a plurality of cylinder units, each with glow plug (13) in its combustion chamber, and said control device (15) has outputs (19b, 19c) for supplying electric power to one or both of said two heater plugs (14) in response to the temperature level of said engine and wherein said control device has an output (19a) for operating said sheathed-element glow plugs (13).

3. A method of cold starting a diesel engine having at least one cylinder unit, including a cylinder, a piston and a cylinder head forming a combustion chamber in which a sheathed-element glow plug (13) is positioned and an air intake structure in which at least one heater plug (14) is installed, said method comprising the steps of:

providing an automatic control device for said plugs which is responsive to engine temperature, starting said diesel engine in a cold condition including heating said plugs by said control device responsive to engine temperature for a predetermined warm up period, said control device supplying electric power to one of said glow and heater plugs (13, 14) upon said engine temperature being below a first predetermined value and said control device supplying electric power to said glow plug (13) and to said heater plug (14) upon said engine temperature being below a second predetermined value.

4. The method of claim 3 wherein said control device (15) supplies electric power to said heater and glow plugs (14, 13) in response to ambient temperature and at least one engine temperature.

\* \* \* \* \*

UNITED STATES PATENT AND TRADEMARK OFFICE
CERTIFICATE OF CORRECTION

PATENT NO. : 5,862,786
DATED : -1/26/99
INVENTOR(S) : Heinz-Wolfgang Fuchs, Reinhard Rechberg and Harald Siegert It is certified that error appears in the above-identified patent and that said Letters Patent is hereby corrected as shown below:

Claim 1, line 12, after "glow" insert --plugs-- ;

Claim 1, line 16, cancel "Parameter" and substitute ---parameter---.

Signed and Sealed this

Twentieth Day of July, 1999

Attest:

Q. TODD DICKINSON

*Attesting Officer*     *Acting Commissioner of Patents and Trademarks*